United States Patent Office 3,048,129
Patented Aug. 7, 1962

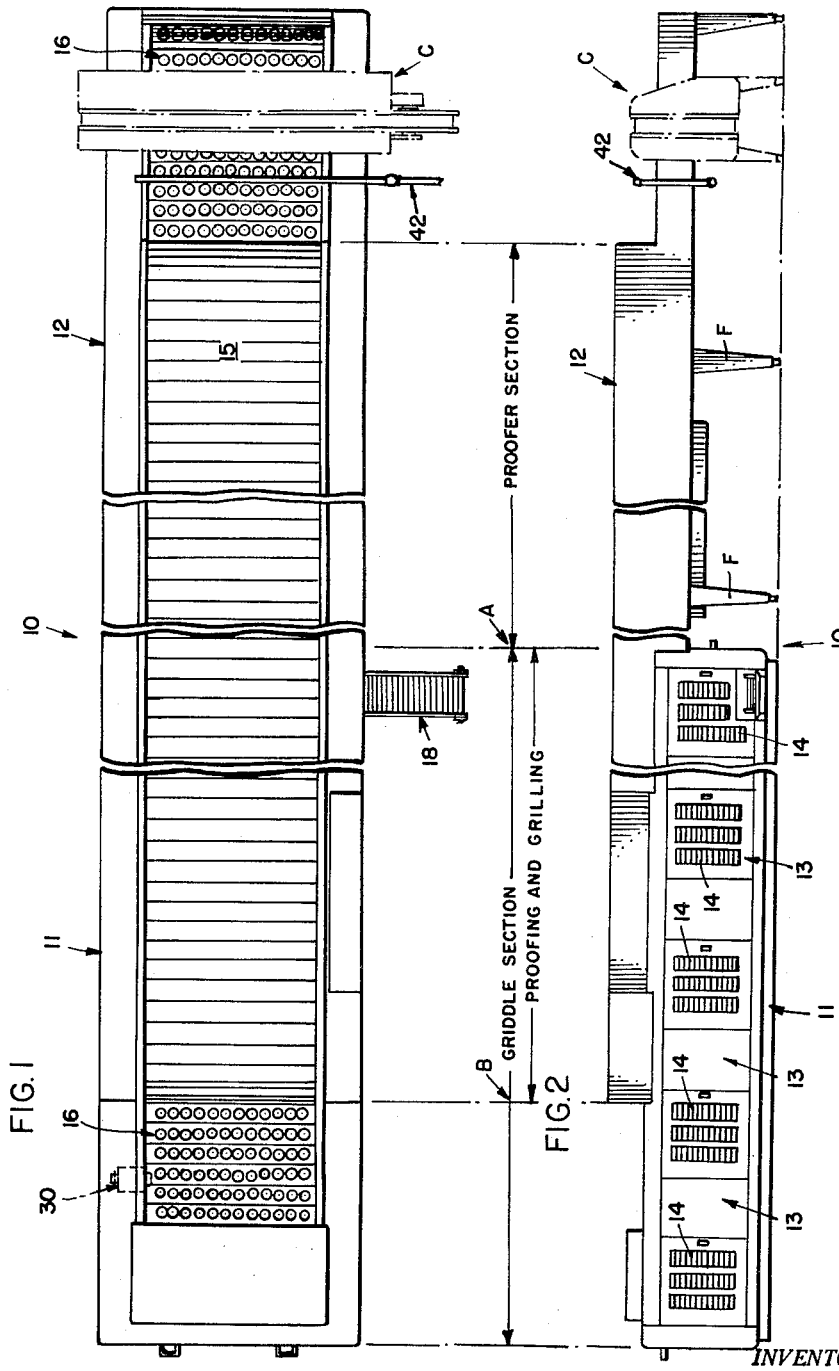

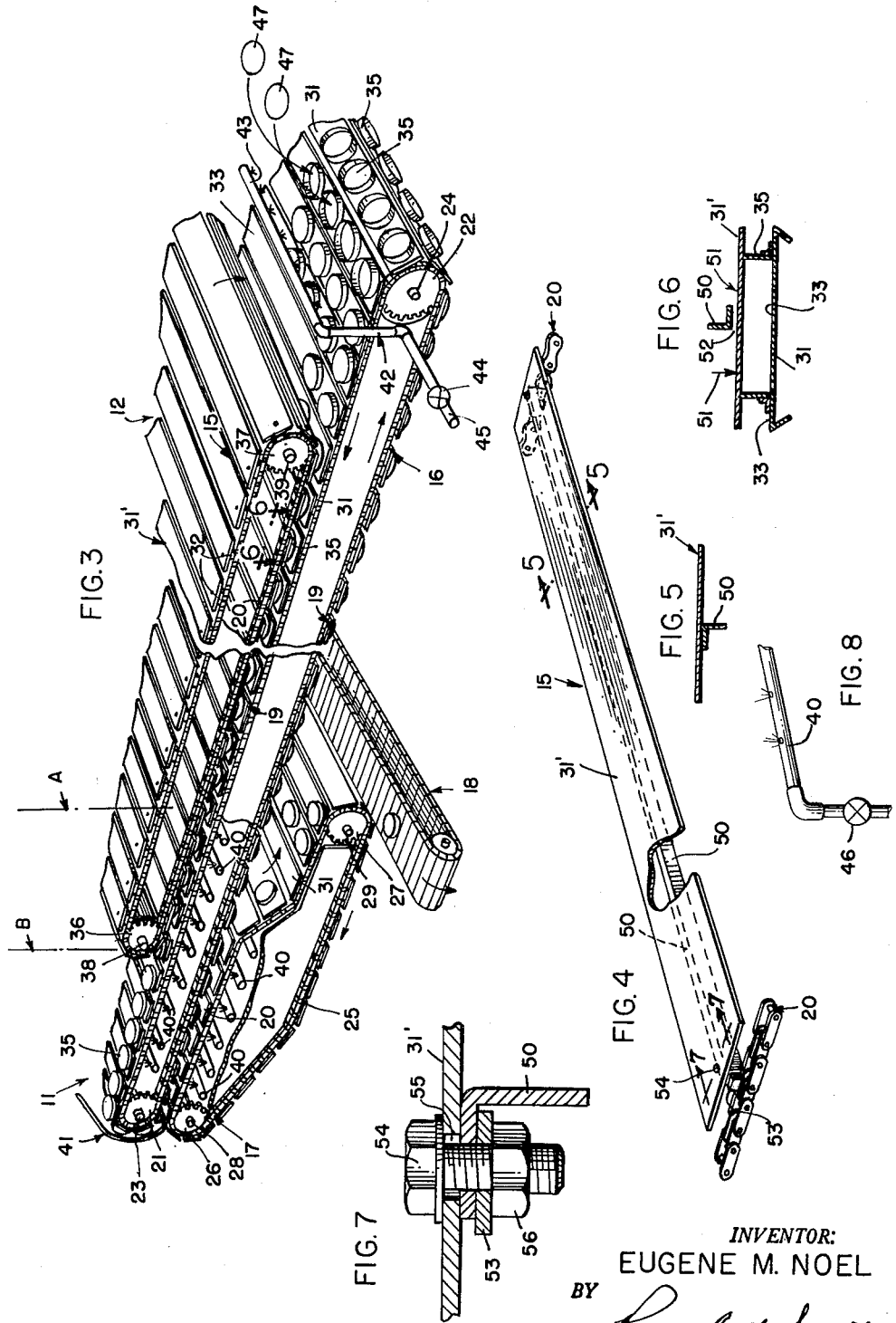

3,048,129
PROCESS FOR CONTINUOUS PROOFING AND GRILLING AND APPARATUS THEREFOR
Eugene M. Noel, 238 Main St., Cambridge 42, Mass.
Filed Oct. 26, 1959, Ser. No. 848,785
12 Claims. (Cl. 107—54)

This invention relates to a process for reducing the proofing time for dough compositions employed in the manufacture of English muffins and the like and apparatus therefor. More in particular this invention relates to a process and apparatus for continuously proofing and grilling English muffins at a greatly reduced period of time.

In the manufacture of English muffins one important operation requires that the dough be "proofed," sometimes known as "recovery" or "raising," just prior to grilling. The trade generally refers to this operation as the "proof time." According to conventional methods the proof time ranges from a minimum of 20 minutes to 45 minutes and sometimes even longer. The conventional operation of proofing requires considerable space and labor requirements for a given commercial rate of production. One of the principal objectives of this invention, as will be evident herein, is to reduce materially the space and labor requirements as well as cost of the proofing operation.

English muffin dough is generally composed of flour, water, salt, sugar, malt, yeast, mold inhibitor, shortening and enrichment. Using these ingredients in various known proportions bakers produce dough of the following three types.

The first type is known as "Straight Dough" which means that all ingredients comprising the dough are mixed at one time and the dough is given a fermentation period varying from about one hour to 4.5 hours.

The second type is known as "Sponge Dough" which means that a sponge or part of the dough is mixed ahead of time and allowed to ferment as a so-called sponge for a period of time ranging from 2.5 to 6 hours. This sponge which will range from 60 to 70% of the total mix, is then again placed in the mixing apparatus and the balance of ingredients, flour and water, are added and resulting mass is mixed into the final dough. The final dough is then given a fermentation period ranging from 15 minutes to an hour, as fermentation has already occurred in the sponge stage above referred to.

The third type is known as a "No-Time Dough" which means that all ingredients are mixed together at one time and a much higher percentage of yeast is added to reduce the fermentation period. After mixing the dough is retained in a trough for a period of about 15 minutes but because of the added yeast carbon dioxide gas forms more rapidly.

In any case the dough is normally at a temperature of 78° to 90° F. when it is removed from the mixer; and the present invention is adapted for use with any of the above three types of dough.

As the next step the dough passes through a divider machine where the dough is divided into pieces of predetermined weight uniformly and forms each piece of dough into spherical or ball shaped. This is known as a "dough ball" and at this stage usually has a temperature of about 80 to 90° F.

At this point the dough ball is given what is known as proof time. Conventionally this proof time is accomplished under controlled conditions ranging from about 96 to 110° F. at a relative humidity of from 86 to 94 percent for a period of 20 to 45 minutes in order to allow the yeast to convert the sugar and gluten, and to restore gas lost in handling the dough in the dividing operation. It will be noted that in order to provide the necessary conditions for proofing the dough balls, a special chamber is provided which meets the above air conditioning requirements.

After the dough balls have been proofed they are removed from the proofing chamber and manually placed on a hot griddle and manually turned over for grilling or baking on the other side. The grilled English muffin product thus obtained is cooled and packaged for shipment.

At least one English muffin manufacturer operating in accordance with the above conventional procedure required the following number of employees to perform the necessary operations:

| Operations: | Employees required |
|---|---|
| A. Mixing | 1 |
| B. Transport and handling after mixing | 1 |
| C. Dividing | 1 |
| D. Placing dough in proofing containers | 1 |
| E. Moving proofing containers into and out of proofing chamber | 1 |
| F. Placing dough balls on griddle | 2 |
| G. Turning dough balls on griddle | 2 |
| H. Transport from griddle | 1 |
| I. Packaging | 3 |
| Total employees required | 13 |

In accordance with the present invention the number of employees required for the same volume production is reduced from 13 to only 4 as will later be evident.

One important objective of this invention is to provide a process for greatly reducing the proof time in the manufacture of English muffins and the like, independent of ambient atmospheric conditions.

Another object of this invention is to eliminate the necessity of a proofing chamber and its attendant air conditioning apparatus in the manufacture of English muffins and the like.

Still another object of this invention is to provide a combination proofer and griddle for proofing and grilling English muffins and the like continuously.

A further object of this invention is to utilize waste heat from the grilling operation for proofing the dough balls in the manufacture of English muffins and the like.

A yet further object of this invention is to reduce greatly the labor and space requirements in the manufacture of English muffins and the like.

A still further object of this invention is to provide automatic means for proofing the dough balls, in the manufacture of English muffins and the like, wherein every dough piece is subjected to exactly the same temperature, humidity, and proof time.

Other important objects of this invention are to reduce greatly the cost of manufacture of English muffins and the like; to improve the product; and to greatly increase the uniformity of the product.

These and other desirable and important objects inherent in and encompassed by the invention will be more readily understood from the ensuing description, the appended claims and the annexed drawings wherein:

FIGURE 1 is a plan view partly broken away, illustrating the general arrangement of the continuous proofing and grilling apparatus embodying this invention.

FIGURE 2 is a side elevation of FIGURE 1 illustrating the external hood thereof.

FIGURE 3 is a perspective view of the apparatus, partly broken away, illustrating the arrangement of the conveyors disposed within the hood of FIGURES 1 and 2.

FIGURE 4 is a perspective view, partly broken away and partly in section, showing the construction of one flight member of the cover conveyor of FIGURE 3.

FIGURE 5 is a sectional view of one flight of the cover conveyor of FIGURE 3 taken on line 5—5 of FIGURE 4.

FIGURE 6 is a sectional view of one flight of the upper run of the product conveyor and a portion of the complementary flight of the bottom run of the cover conveyor as taken on line 6—6 of FIGURE 3 and illustrating one mold cup on the product conveyor covered on the open end thereof.

FIGURE 7 is an enlarged sectional detail, as taken on line 7—7 of FIGURE 6, showing the mounting of a cover conveyor flight to a respective conveyor chain, and FIGURE 8 is a view illustrating one means for regulating the grill burners.

During the course of investigation and development of this invention, an open top metal mold cup having a circular internal contour was mounted on a metal plate of conventional muffin griddle gauge. The mold cup and plate was then heated to a mean temperature of about 175° F. A dough ball (straight dough type previously described) having a temperature of about 85° F., taken directly from the dividing operation, was placed into the heated mold cup and the cup was then covered and heated gradually and uniformly over a period of about 10.5 minutes (at a rate of about 13° F. rise per minute in the dough), the cup attaining a temperature of about 260° F. and the dough ball about 220° F. The cover over the mold cup was employed to restrict exposure of the dough ball to the atmosphere thereby retaining most of its moisture. It was found that at the end of this period the dough ball was proofed to about the same degree as that obtained in the conventional proofing chamber discussed above. Furthermore because of its elevated temperature the proofed dough ball could be grilled immediately in less time than the conventional method. Sponge dough and no-time dough previously described were similarly tried yielding comparable results.

Further experimentation indicated that satisfactory proofing could be obtained when the temperature of the dough ball, taken immediately after the dividing operation, ranged between 65 to 90° F. although the range of 78 to 88° F. was found to be more preferable for all three types of dough. Experimentation also showed that the mean temperature of the mold cup could vary between 135 to 190° F. with satisfactory results although the range between 170 and 180° F. was found to be more preferable.

The rate of temperature increase of the mold cup is dependent upon the initial temperature thereof and the total time for proofing. It was found that satisfactory proofing on all three types of dough could be obtained in the covered mold cup in from 9 to 20 minutes wherein the cup was uniformly heated to raise its temperature at a rate of 7 to 14° F. per minute. However, the more preferable ranges were found to be 9 to 13 minutes at a uniform rate of temperature rise of the mold cup between 7 to 9° F. per minute.

Range limits outside that described above resulted in unsatisfactory proofing in that the time requirement was too long or non-uniformity of proofing throughout the dough ball occurred.

In the course of the investigation for the purpose of developing a process for reducing the proof time of dough balls as described above, it was found that if the surface of the dough ball was moistened with a liquid, particularly water, immediately after the dough ball is placed into the pre-heated mold cup and before applying the cover thereon, the chemical action of proofing occurring in the dough was hastened and the uniformity of the texture of the dough, comparing the center with that near the surface, was greatly improved. Furthermore, it was found that the dough ball remained soft during the proofing cycle with the result that better flow characteristics were obtained and a better proofed dough ball resulted. Corresponding improvement was observed when various amounts of water or steam were applied on the surface of the dough ball until 2 to 5 percent by weight of water, based on the weight of the dough ball, was added. This moisture amount will vary directly with the protein and gluten content of the dough ball or flour used. This was found to be true for all three types of dough.

At the end of the proof time, according to the process of this invention above described, it was observed that the temperature of the proofed dough ball ranged between 200 to 230° F. the more preferable temperature being about 220° F. as measured by inserting a thermometer into the soft dough.

Since, as pointed out previously, that in accordance with this invention the dough ball at the end of the process attains a temperature of 200–230° F. it becomes evident that, in order to make the process invention practical in commercial production, grilling must commence before completion of the proofing cycle. Having this in mind the following described apparatus, as part of this invention, has been found to be satisfactory in carrying out the process invention on a commercial production scale.

In my Patent No. 2,859,713 (now Reissue Patent Re. 24,855) there is described a continuous griddle for baking or grilling English muffins and the like comprising heated upper and lower conveyors wherein proofed dough balls are fed at the forward end of the upper conveyor continuously and the grilled muffins are subsequently discharged at the forward end of the lower conveyor. In order to utilize the waste heat from the griddle, shown in the above mentioned patent, for use in the proofing process of this invention, a preferred embodiment of this invention advantageously combines the proofing apparatus with the griddle as will now be described.

Referring to FIG. 1 of the drawings the numeral 10 indicates a continuous proofer-griddle combination apparatus having a rearward griddle section indicated at 11 and a proofer section indicated at the forward portion at 12. The griddle section 11 is provided with hood portions indicated at 13 having air inlet openings 14 as best shown in FIGURE 2.

Referring now to FIGURE 3 of the drawings there are illustrated four conveyors, the first conveyor indicated at 15, the second conveyor indicated at 16, the third conveyor indicated at 17 and the fourth conveyor indicated at 18. The conveyor 18 is a lateral discharge conveyor which merely carries the grilled product away from the apparatus and is identical in construction and function with the lateral conveyor shown in my previously mentioned patent at 36 in FIGURE 1 thereof. Also the conveyor 17 herein is identical with the lower conveyor described in the same patent at B in FIGURE 1 thereof.

Referring again to FIGURE 3 of the drawings the conveyor 16, as shown, is constructed identically the same as the upper conveyor illustrated at A of FIGURE 1 in my previously mentioned patent except that it is further elongated, extending forwardly a considerable distance beyond that shown in the patent. From this it is evident that the griddle section 11, with the above mentioned exception, is constructed in the same manner as that of the patent, reference thereto being had.

With the foregoing in mind the detailed construction of the griddle section 11 is deemed unnecessary to describe here, it being assumed that the construction is substantially the same as that of the aforementioned patent unless otherwise stated herein.

In the form shown in the drawings, the continuous proofer-griddle incorporating the present invention comprises the conveyors 15, 16 and 17 disposed horizontally one above the other as best illustrated in FIGURE 3. Conveyors 15 and 17 move in the same direction and the conveyor 16 moves in the opposite direction as indicated by the arrows. The conveyors 15, 16 and 17 are mounted on a suitable supporting frame of generally rectangular form partly shown at F in FIGURE 2 and fabricated of conventional structural elements. The frame F includes suitable horizontal members, not shown, for supporting the conveyors 15, 16 and 17 and other components of the apparatus as well as the hood portions 13 (FIGURE 2) for enclosing the sides and ends of the apparatus so as to conserve heat as well as to provide a neat external appearance.

The conveyor 16 comprises a pair of endless chains shown at 19 (FIGURES 3 and 4) operating between suitable drive sprockets 21 and 22, which in turn are mounted in drive relation to suitable longitudinally spaced and parallel drive shafts 23 and 24. The conveyor 17 comprises a pair of endless chains, one of which is indicated at 25, operating between suitable drive sprockets 26 and 27 mounted in drive relation on longitudinally spaced and parallel drive shafts 28 and 29. It will be noted that the shaft 23 of conveyor 16 is positioned adjacent and in spaced relation with respect to shaft 28 of conveyor 17. However the shaft 24 of conveyor 16 is positioned above but considerably forward of shaft 29 of conveyor 17. Thus conveyor 16 is considerably longer than that of conveyor 17 and extends forwardly beyond the front end of conveyor 17. It will be understood that the shafts 23, 24, 28 and 29 are journalled in and supported by suitable bearings, not shown, carried by the main frame structure F and, as will be understood by those skilled in this art, at least one shaft of each conveyor, for example shafts 23 and 26, will be positively driven by suitable variable speed drive mechanism indicated at 30 in FIGURE 1.

The construction of the top or uppermost conveyor 15 is similar to that of conveyor 17 except that both the top and bottom runs are parallel to each other and are disposed above and parallel to the conveyor 16 but having a longitudinal length of but a portion of that of conveyor 16 as best shown in FIGURE 3. Although termed a conveyor, because of similarity in structure, the conveyor 15 does not actually carry the product but the term is merely employed for convenience.

As shown in FIGURE 3 and the aforementioned patent, the load carrying area of the conveyor 16 comprises a plurality of transversely extending flat metal, plates or flight members 31 disposed side by side and extending between the parallel endless chains 19, meshed conventionally with the drive sprockets 21 and 22, which plates 31 are of sufficient number and of such width as to form a continuous segmental endless belt or web.

In the form shown, each of the plates 31, comprising the web of conveyor 16, is formed of heavy gauge sheet metal with a flat upper or outer surface 33. The outer surface 33 of each flight member 31 on the conveyor 16, is provided with a plurality of individually removable product forming elements or product retaining rings 35, arranged side-by-side in series along the transverse centerline of the conveyor flight and substantially from end to end of the flight as best shown in FIGURE 3. These rings 35 are fabricated from sheet metal and are ordinarily annular in form with uniformly parallel top and bottom edges so that the rings or forms will rest endwise in complete peripheral contact with the outer flat surface or face 33 of the conveyor flight on which they are mounted. Thus the ring 35 disposed on the flat surface 33 forms a mold cup for forming the product into the desired shape. The rings 35 are connected to the flight 31 of conveyor 16 in the same manner as that described in my aforementioned patent. The principal function of the mold cups formed by the rings 35 is to retain the dough balls of the goods being processed during turn-over transfer to the conveyor 17 and to shape the product as the dough balls expand.

It should be understood therefore that my present invention is not to be limited to the product conveyor flight construction herein shown.

As shown in FIGURE 3, the top run of the conveyor 16 travels horizontally along the upper portion of the apparatus 10 in a direction from front to rear as indicated by the directional arrows and at the rearward end of the apparatus 10 the web of conveyor 16 turns over the sprockets 21 where the flights 31 come into face to face relation with the top run of conveyor 17. Suitable transfer means such as the transfer shoe, apron or guide plate indicated at 41 (FIG. 3) and described in my aforementioned patent are provided at the rearward end of the apparatus 10 to retain the article being processed in the rings 35 as the conveyor flights become inverted while passing around the sprockets 21 as shown in FIGURE 3. As is fully shown and described in my aforementioned patent, the vertical spacing between the bottom run of conveyor 16 and the top run of conveyor 17, at the point where the conveyor flights 31 became fully inverted, is such that the outer edges of the rings 35 will come substantially into contact with the adjacent outer surfaces of the flights comprising the web of conveyor 17. The conveyor 17 as shown is constructed exactly as that of the lower conveyor shown and described in my aforementioned patent and further description thereof is deemed unnecessary here. It will be understood, however, that the conveyor 17 may be of any suitable type, such for example as a conventional steel band.

In connection with the movement of conveyors 16 and 17 as herein shown, it is necessary that the flights of the two conveyors come together in mutually registering face to face relation and it will therefore be understood that the two conveyors will be driven at the same lineal speed so that mutual registration of the individual conveyor flights, at the rearward end of the apparatus 10, will be maintained continuously.

In order to support the endless chains 19 for the conveyors 15, 16 and 17 a plurality of appropriate guide means or trackways, not shown, are provided in the structure comprising the frame F. The trackways for each conveyor may conveniently be the same as that shown and described in my aforementioned patent.

Over a portion of the conveyor 16, in parallel relation, is disposed the conveyor 15. The construction of conveyor 15 is generally similar to, but shorter in longitudinal length, than that of conveyor 16 and the flights 31' forming the web thereof are merely flat metal plates or strips as best illustrated in FIGURES 4 and 5. The conveyor 15, like the others, is comprised of a pair of parallel endless chains in meshed relation with sprockets 36 and 37. The sprockets 36 and 37 are, respectively, carried by drive shafts 38 and 39 in drive relation. The rearward shaft 38 is positioned above the conveyor 16 between the shafts 28 and 29 of the conveyor 17 so that the conveyor 15 extends over the griddle section about two-thirds its length. The forward shaft 39 of the conveyor 15 is positioned rearwardly and above the shaft 24 of conveyor 16, as shown in FIGURE 3, sufficiently to accommodate automatic loading and moistening means as shown in FIGURE 1. At least one of the shafts 38 and 39 is drivingly connected to the drive mechanism 30 (FIGURE 1) in a conventional manner for driving the conveyor 15 at the same speed but in the opposite direction with respect to conveyor 16. As in the case of conveyors 16 and 17 previously described, the movement of the conveyor 15 is synchronized with the movement of conveyor 16 so that the flat flights forming the web of conveyor 15 on the bottom run thereof register with the flights on the upper run of the conveyor 16. The vertical spacing between the bottom or lower run of conveyor 15 and the upper surface of the flights on the top run of conveyor 16 should be substantially equal to the height of the product retaining rings or cups 35, mounted on the flights of the conveyor 16, so that upon registry with the outer surfaces of the bottom run of conveyor 15 the outer surfaces of the flights 31' of conveyor 15 will cover the rings or cups 35 as best shown in FIGURES 3 and 6. The proper location of the sprockets 36 and 37 and the trackways (not shown) supporting the conveyor 15 will obviously accomplish this result. Thus it is apparent that during the main portion of the top run of the conveyor 16, from front to rear of the apparatus 10, all of the product retaining rings or cups on the top run of conveyor 16 will be covered to enclose the dough therein. The trackways for supporting the endless chains 19 of the conveyor 15 are mounted on the frame F so as to be adjustable vertically throughout their lengths to permit adjustment of the time during which the cups or rings remain covered and hence variation of the proofing period. For convenience these trackways may be of the same form as the trackways for conveyors 16 and 17.

As shown in FIGURES 4 to 7 inclusive, the plates or flights 31', of the conveyor 15, which function as cover plates for the rings or cups 35 on the product carrying conveyor 16, are simply flat plates or strips of flexible sheet metal mounted on and extending between the chains 20 transversely of the conveyor run. The conveyor 15, or cover conveyor, is thus not a load bearing means. The plates 31', however, are loosely connected to the chains 20, as shown in FIGURE 7, to permit limited movement in the vertical direction when inverted and hence have a tendency to sag between the chains 20, while in the upper run of the conveyor 15, and may take a concave "set" so that when they pass to the lower run and meet the edges of the cups 35 on the conveyor 16 they will not drop to rest uniformly on the edges of all of the cups 35 to close them against loss of moisture by evaporation.

Therefore, in order to prevent such a sag that the plates 31' will take a concave "set," a stiffening bar or angle member 50 is disposed on the inner side of each cover plate, and is bolted loosely at each end to the plate and firmly to the mounting brackets which secure the plate to the chains 20 as shown in FIGURES 4 and 7. The bar 50 is secured directly below the plate 31', as indicated in FIGS. 4 and 7 and when the plates are in the upper run of the conveyor 15 they will rest on the bar, as indicated in FIGURE 5, to hold them level from end to end. Then when the plates become inverted in the lower run of the conveyor, to meet the cups 35, they are free to drop gravitationally away from the support bar 50 and to rest on the edges of the cups to fully close the same, as shown in FIGURE 6, wherein the arrows 51 represent the gravitational force and the gap 52 indicates the fact that the plate drops away from the bar 50.

This is made possible by mounting the plates 31' and the support bars 50 on special laterally projecting brackets 53, which extend inwardly from the chains 20. As shown in FIG. 7 the end of the support bar 50 rests directly on the bracket 53 where it is held by a bolt 54. The bolt has a snug fit in the aligned bolt holes of the bracket and support bar, however, the bolt hole 55 in the plate 31' is made with a diameter larger, by about 3/16 inch, than the bolt diameter so that the plate has limited freedom of movement in the transverse direction. The bolt is secured by a self-locking nut 56, but the bolt is not drawn up tight, so as to leave the plate 31' free to move. Thus when the plate becomes inverted, in the bottom run of the conveyor 15, it is free to drop or sag as may be necessary to securely cover all of the cups on the mating flight of the conveyor 16.

In the construction and arrangement of the present invention a rearward portion of the upper runs of conveyors 16 and 17 constitute the grilling or baking surfaces of the machine and is best illustrated in FIGURE 3. These surfaces are heated by means of gas burners of the restricted ribbon flame type which extend laterally across the apparatus 10 parallel with and immediately below the top runs of both conveyors 16 and 17. In the form shown the burners are spaced at intervals from the rearward end forwardly for a predetermined distance. Each burner comprises a pipe 40 extending substantially from side to side of the machine and connected to a source of gas fuel (not shown). It is preferable to provide a control valve 46 for each of the pipes 40, as indicated in FIG. 8, so that the heat can be controlled as desired. Each of the pipes 40 is constructed the same as that described in my aforementioned patent and is provided with a plurality of ribbon-type gas jets or orifices which are transversely spaced apart on centers equal to the center-to-center spacing of the retaining rings or cups 35 as they are arranged along the centerline of the flights 31 of conveyor 16. Thus as the product in the retaining cups 35 moves with the conveyors 16 and 17, the multiple heat sources will be directly on the lines of product travel thereby concentrating the heat directly against the surface areas on the conveyor flights on which the product is resting. The fuel control means 46 for each burner may be conventional and need not be described here.

The vent openings 14, in the hood portions 13, provide for the admission of air for combustion, and the hood portions confine the air and products of combustion to rise upwardly between the conveyor web plates to the space above the griddle part of the apparatus where the combustion products and heated excess air may be removed by suitable ventilating means (not shown).

Referring again to FIGURE 3, it will be seen as previously described that conveyor 16 projects a short distance forwardly of the forward end of conveyor 15. Above the conveyor 16 and directly forward of the conveyor 15 is disposed a moisture applicator generally indicated at 42.

The applicator 42 may be comprised of a tube 43 extending transversely across the apparatus 10 slightly above the top run of the conveyor 16. The tube 43 is provided with a plurality of orifices in transverse spaced relation and directed downwardly. The transverse spacing of the orifices is such that as each product containing cup 35 on each flight 31 of conveyor 16 passes beneath the tube 43 a spray of moisture under pressure in the tube 43 emitted through the orifices is directed toward the center of each of the cups 35. This spray may be steam or a fine spray of liquid. Thus the product in each ring 35, as it passes beneath the applicator 42, receives a measured amount of the moisture desired. The measuring may conveniently be regulated by an automatic control valve 44, having a manually adjustable discharge orifice, interposed between the applicator 42 and the inlet line 45 from the liquid source, not shown, or by any other suitable means. It will be understood that operation of the valve 44 in timed relation with the movement of the conveyor 16 may be had by suitable means, not shown, such as that disclosed in my Patent No. 2,962,984 dated December 6, 1960. Also in the event that the source of pressure at the inlet 45 is unstable, a conventional pressure regulator (not shown) may be interposed in the moisture supply system.

*Operation*

Referring to FIGURES 1, 2 and 3 it will be seen that the apparatus 10 comprises two operating sections. The forward section ending at B in FIGURE 3 is the section to which this invention is primarily directed and is termed "Proofer Section" while that section rearwardly of A is the "Griddle Section." The griddle section operates and functions substantially identically with that of my aforementioned patent.

The power for operating the drive mechanism 30 is connected thereby setting the conveyors 15, 16 and 17 in motion. The gas burners are then ignited and the apparatus 10 is allowed to run for a period of time sufficient to reach thermal equilibrium. In the case of manufacturing English muffins the conveyor speed is preferably adjusted so that the time lapse required for the first upper flight 31 at the forward end of the conveyor 16 to reach the griddle section A is between 5 and 15 minutes, or for example 10.5 minutes. The gas burners 40 are then adjusted so that as the same flight 31 of conveyor 16 passes through the griddle section it will attain sufficient temperature to grill the muffins on the first or lower side. When the apparatus has reached thermal equilibrium and because the proofer section is enclosed on its sides and ventilation is controlled, the flight 31, which on its return run has a temperature of about 400° at point A, will, when it returns to the forward end of the proofer section, still retain sufficient heat to have a mean temperature of 135 to 190° F., or for example a preferable mean temperature of about 175° F. This temperature for the plates of the conveyor 16, at the start of its upper run, is important to the improved proofing process as will hereafter appear. The pressure control valve 44 is then adjusted to supply moisture, e.g. wet steam, to the applicator 42 at a selected rate depending on factors previously discussed, and the apparatus 10 is now ready for charging dough balls for proofing and subsequent grilling to produce English muffins.

Dough balls 47 at about 85° F. which may be of any of the three types mentioned, unproofed, as taken directly from the dividing operation previously described, are placed one in each of the mold cups 35 on each flight 31 of conveyor 16 as the flights progressively rise to begin their top run. Charging of the mold cups 35 may be manually or by an appropriate material handling machine as indicated at C in FIGURES 1 and 2.

When automatic loading is employed, means for depositing a measured amount of corn meal in each cup will precede the loader.

As each flight 31 containing the dough balls 47 moves rearwardly on the conveyor 16 from the charging zone at the forward end of the apparatus 10, they pass beneath the moisture applicator 42 where each dough ball receives a predetermined quantity of moisture deposited thereon. As the conveyor 16 moves the dough balls from the applicator zone, flights from the bottom run of the conveyor 15 engage in covering relation (illustrated in FIGURE 6) the top of the mold cups 35 with the dough balls therein. Thus the moisture from the applicator, the moisture in the dough, and the gases created by proofing are restricted from the atmosphere and are retained within the mold cups during the entire proofing cycle.

It will now be seen that the dough ball, as it passes through the proofer section, is being progressively subjected to a continuously rising temperature. This is due to the fact that as the flights 31 travel toward the griddle section, in the top run of the conveyor 16, they are being progressively heated by the residual heat rising naturally from the hot plates of the bottom run of the conveyor 16 as they travel from the griddle section toward the front end of the proofer. This progressive raising of the temperature of the plates and cups in the top run of conveyor 16, together with the plate temperature at the time the dough balls are placed in the cups, creates an "induced proof" of the dough ball, because the heat produces the carbon dioxide gas within the dough ball to do the proofing, and the continual rise of temperature within the dough ball thus materially reduces the time required for the dough balls to reach full volume or size. Also the cup being thus additionally preheated before reaching the griddle section will result in faster grilling of the muffin. Thus in the improved process of the present invention, with the overlap of the proofing and griddle sections, there is a short period of 2 to 3 minutes during which proofing and grilling are being done simultaneously. In order to permit variation of this overlap period the tracks for the bottom run of the cover conveyor 15, between the points A and B, are made adjustable vertically so that the cup cover plates can be lifted at the point desired to stop the proofing and allow a crust or skin to form on the exposed dough ball surface.

When movement of the top run of the conveyor 16 has carried the dough balls 47 to the beginning of the griddle section at A the dough balls 47 will have reached an internal temperature of about 115° F. because of the aforesaid progressive heating of the conveyor plates 31. At the beginning of the griddle section at A the flight approaches the first gas burner position where the rate of heating the dough balls is suddenly and materially increased. Then, as the conveyor 16 progresses and reaches the rearward end of the conveyor 15, as denoted by B in FIGURE 3, the dough balls 47 will reach a temperature of about 220° F.

When the dough balls 47 reach the griddle section at A the proofing thereof will have reached the same magnitude as that attained in the conventional proofing chambers previously described and the dough balls 47 will have expanded to fill substantially the mold cups 35. However, as the dough balls 47 are moving in the zone from A to B, under a greatly increased heating rate due to the burners 40, proofing continues but at the same time the bottom portions of the dough balls are grilled to some extent. This results in the dough balls completely filling the cups 35 so as to have uniformly flat tops and straight sides and at the same time assures a desirable cellular structure in the finished muffin.

As the conveyor 16 carries the dough balls 47 to point B the cover flights of conveyor 15 are separated from the mold cups 35 at a predetermined location, thus permitting excess moisture to evaporate, so that the tops of the muffins will have a dry skin, and at the same time progressive grilling of the bottom portion of the muffins 47 continues until the rearward end of the conveyor 16 is reached. At this point the transfer guide means 41 guides the partly grilled muffins 47, as the flights move around the sprockets 21 from the top run to begin the bottom run, so that the muffins 47 are retained in the mold cups 35 for gentle bumpless transfer to the conveyor 17. As the flight starts the bottom run on the conveyor 16 the upper flights of conveyor 17 register to receive the inverted products from the mold cups 35 and heating by the lower burners 40 is applied to grill the other side of the muffins. At the forward end of the conveyor 17 the finished grilled muffins are discharged by gravity to the discharge conveyor 18 which in turn carries the finished product to a cooling section and thence to the packaging and shipping stations, not shown.

From the above it can be seen that the griddle section functions in the same manner as that described and shown in the aforementioned patent and the proofer section of this invention not only eliminates the necessity of providing individual proofing chambers, and the attendant air-conditioning equipment and floor space therefor, but also utilizes the otherwise wasted heat of the bottom run of conveyor plates returning from the griddle section, which heat, by radiation and some convection, is transferred to the upper run of the conveyor 15 in the proofer section to accomplish the proofing of the dough balls by the improved method.

Insofar as labor requirements are concerned, a comparison showing the reduction from that previously described is tabulated below:

| Operation | Employees Required Conventional | New |
|---|---|---|
| A. and B. Mixing and loading divider | 2 | 1 |
| C. and D. Dividing and placing dough in proofing containers | 2 | 1 |
| E. Handling proofing containers into and out of proofing chamber | 1 | |
| F. Placing dough balls on griddle | 2 | |
| G. Turning and removing from griddle | 2 | |
| H. Transport from griddle | 1 | |
| I. Packaging | 3 | 2 |
| Total | 13 | 4 |

From the above it can be seen that according to this invention the operational labor requirements are reduced approximately 70 percent; in addition less floor space is required. The proof time required is substantially reduced and a greater production rate per hour is obtained. In case an automatic loading means is not used for operation D on a large size machine an additional person must, of course, be employed.

Having thus described a preferred embodiment of the invention, it can now be seen that the objects of the invention have been fully achieved and it must be understood that changes and modifications may be made which do not depart from the spirit of the invention nor from the scope thereof as defined in the appended claims.

What is claimed is:

1. A continuous proofer comprising a first endless conveyor disposed above a second endless conveyor in substantially horizontal relation, each of said conveyors having a belt-like web providing top and bottom runs and said webs moving at the same speed in opposite directions between respective forward and rearward end sprockets carried by respective parallel spaced shafts, each of said webs comprising a succession of narrow transversely extending sheet metal plates disposed in parallel edge-to-edge relation and each having a flat outer surface through its length, said plates having the same center-to-center relation along the lengths of both said webs, a plurality of individual open top product retaining cups of uniform height on the outer surface of each of the plates of said second conveyor web, said first conveyor being disposed with its bottom run beginning at a predetermined distance rearwardly from the forward end of said second conveyor and extending parallel with the top run of said second conveyor, the outer surfaces of the respective conveyor plates being spaced apart vertically a distance substantially equal to the height of said retaining cups to close the top end thereof, means disposed adjacent and below the top run of said second conveyor for heating the plates and retaining cups thereof as the web passes thereover, and moisture applicator means disposed over the forward end portion of said second conveyor and forward of said first conveyor whereby said retaining cups of said second conveyor are supplied with moisture prior to engagement in registry with said plates of said first conveyor.

2. A continuous proofer according to claim 1 wherein the moisture applicator means comprises at least one tube disposed transversely and adjacent to the forward end portion of said second conveyor, said tube being provided with a plurality of transversely disposed orifices directed toward the inner portion of said retaining cups of said second conveyor whereby said cups and the contents thereof are supplied with moisture as they move past said orifices, and means for controlling the rate of moisture flow from said orifices.

3. A continuous proofer comprising a first endless conveyor disposed above a second endless conveyor in substantially horizontal relation, each of said conveyors having a belt-like web providing top and bottom runs and said webs moving at the same speed in opposite directions between respective forward and rearward end sprockets carried by respective parallel spaced shafts, each of said webs comprising a succession of relatively narrow transversely extending metal plates disposed in parallel edge-to-edge relation and each of the plates of said first conveyor having a flat outer surface throughout its length, said plates having the same center-to-center relation along the lengths of both said webs, a plurality of individual open top product retaining cups having side walls of uniform height on the outer surface of each of the plates of said second conveyor web, each of said plates of said first conveyor having a re-enforcing means extending along the longitudinal center-line of the inner surface thereof for supporting said plate lengthwise during movement of the plate along the upper run of said first conveyor, said means being loosely secured to each plate adjacent its ends only and being free of said plate therebetween to permit gravitational movement of the plate upon inversion thereof at the lower run of said first conveyor, said first conveyor being disposed with its bottom run beginning at a predetermined distance from the forward end of said second conveyor and extending parallel with the top of said second conveyor and with the outer surfaces of the respective conveyor plates spaced apart vertically a distance substantially equal to the height of said product retaining cups to close the open ends thereof, a moisture applicator disposed above said second conveyor forwardly of said first conveyor, said applicator having a plurality of orifices directed toward the inner portion of said retaining cups of said second conveyor for moistening the interior of said cups as they move past said orifices, and a plurality of heat producing devices extending transversely beneath the top run of said second conveyor adjacent the rearward end thereof, said devices being spaced from each other longitudinally of said second conveyor, and means enclosing the sides of said first and second conveyor whereby heated air produced by said heat producing devices is confined to flow upwardly between the plates of said second conveyor.

4. A proofer according to claim 3 wherein the time for travel of one of the plates of the top run of the second conveyor from the forward end of the first conveyor to the rearward end thereof is between 9 and 20 minutes.

5. A proofer according to claim 3 wherein the second conveyor extends beyond the rearward end of the first conveyor, the heat producing devices being adjustable to provide sufficient heat to raise progressively the temperature of the plates and retaining cups of said second conveyor to 240° F. adjacent the rearward end of the first conveyor and to about 400° F. at rear end of said second conveyor, and the time for travel of one of the plates of the bottom run of said second conveyor from the rearward end to the forward end thereof is adjustable whereby said plates and rings will cool to temperatures ranging between 135° F. and 190° F. adjacent the forward end of said second conveyor.

6. A continuous proofer and griddle combination comprising a first endless conveyor disposed above a second endless conveyor and a third endless conveyor disposed below said second conveyor in substantially horizontal relation, each of said conveyors having a belt-like web providing top and bottom runs and said webs moving at the same speed, said first and third conveyors moving in the same direction and said second conveyor moving in the opposite direction between respective forward and rearward end sprockets carried by respective parallel spaced shafts, each of said first and second conveyor webs comprising a succession of relatively narrow transversely extending metal plates disposed in parallel edge-to-edge relation, each plate of the first conveyor having a flat outer surface throughout its length, said plates having the same center-to-center relation along the lengths of both said webs, a plurality of open top product retaining means of uniform height on the outer surface of each of the plates of said second conveyor web providing individual cups, each of said plates of said first conveyor having a transversely extending reinforcing bar positioned on the inner side of the plate adjacent the transverse centerline thereof for supporting said plate lengthwise during movement of the plate along the upper run of said first conveyor, said bar being loosely secured to the respective plate at its ends only and being free of the plate therebetween to permit free gravitational movement of the plate upon inversion thereof at the lower run of said first conveyor, said first conveyor being disposed with its bottom run beginning at a predetermined distance rearwardly of the forward end of said second conveyor and extending rearwardly and with the outer surfaces of the respective conveyor plates spaced apart vertically a distance substantially equal to the height of said retaining means to close the adjacent ends thereof, the rearward end of said first conveyor being positioned a predetermined distance forwardly of the rearward end of said second conveyor, said third conveyor being disposed with its top run extending parallel with the bottom run of said second conveyor for a predetermined distance adjacent the rearward end thereof and with the outer surfaces of the respective conveyor webs spaced apart vertically a distance substantially equal to the height of said retaining means to close the open ends thereof, transfer guide means disposed adjacent the rearward end of said second conveyor terminating immediately above and in overhanging relation with the top run of said third conveyor at a point inwardly of the respective rearward sprocket shaft, means intermediate the ends of said third conveyor for increasing the vertical spacing between the bottom run of the second conveyor and the top run of the third conveyor to release gravitationally products in said retaining means for exposure thereof to the surrounding atmosphere and for conveyance of said products by said third conveyor only during the remainder of the horizontal top run thereof, and heat producing devices extending transversely beneath the rearward portions of the top runs of said second and third conveyors and spaced at intervals therealong for heating the plates and retaining means of said conveyors.

7. A continuous proofer and griddle combination according to claim 6 having a moisture applicator disposed above said second conveyor forwardly of said first conveyor, said applicator having a plurality of orifices directed toward the inner portion of said retaining means of said second conveyor for moistening the contents thereof as they move past said orifices.

8. A process for proofing and grilling an unproofed English muffin dough ball having an initial temperature of 65 to 90° F., comprising the steps of forming a dough ball from newly fermented dough, depositing said dough ball in a mold cup, said mold cup having a temperature between 135 and 190° F., depositing a cover on said cup to close said cup for restricting exposure of said dough ball to the atmosphere, heating said mold cup to increase the temperature of said cup at a uniform rate of between 7 and 14° F. per minute for a period of from 9 to 20 minutes to proof said dough ball, increasing the heating rate when said cup reaches a temperature of about 260° F. to commence grilling said proofed dough ball to produce a finished muffin, removing said cover from the cup to permit formation of a dry skin on the exposed surface of the dough ball, and then inverting the dough ball onto a grill and grilling the dry skin side thereof.

9. A process for proofing and grilling an unproofed English muffin dough ball having an initial temperature of 65 to 90° comprising the steps of forming a dough ball from newly fermented dough, depositing said dough ball in a mold cup having a mean temperature of between 170 and 180° F., depositing a cover on said cup to close said cup for restricting exposure of said dough ball to the atmosphere, heating said cup to increase the temperature of said cup at a uniform rate of 7 to 9° F. per minute for a period of from 9 to 13 minutes to proof said dough ball, removing said cover from said cup to permit the formation of a dry skin on the exposed surface of the dough ball, and thereafter completing the grilling of said proofed dough ball to produce a finished muffin.

10. A process for proofing and grilling an unproofed English muffin dough ball having an initial temperature of 65 to 90° F., comprising the steps of forming a dough ball from newly fermented dough, depositing said dough ball in a mold cup, said mold cup having a temperature between 135 and 190° F., moistening the surface of said dough ball with water in an effective amount of 2 to 5 percent by weight of said dough ball, depositing a cover on said cup to close said cup for restricting exposure of said dough ball to the atmosphere, heating to increase the temperature of said cup at a uniform rate of between 7 to 14° F. per minute for a period of 5 to 15 minutes, then increasing the rate of heating said cup to commence grilling said dough ball to produce a finished muffin, then removing said cover from said cup to stop the proofing process and to dry the exposed surface of the dough ball, and then inverting the dough ball onto a grill and grilling the dry skin side thereof.

11. A process for proofing and grilling an unproofed English muffin dough ball having an initial temperature of 80 to 90° F., comprising the steps of forming a dough ball from newly fermented dough, depositing said dough ball into a mold cup having a mean temperature between 170 and 180° F., moistening the surface of said dough ball with water in an effective amount of 2 to 5 percent by weight of said dough ball, depositing a cover on said cup to close said cup for restricting exposure of said dough ball to the atmosphere, heating said cup to increase the temperature of said cup at a uniform rate of 7 to 9° F. per minute for a period of from 9 to 18 minutes to proof said dough ball, increasing the rate of heating said cup during the last two to three minutes of the proofing period to commence grilling said dough ball to produce a finished muffin, then removing said cover from the cup to dry the exposed surface of the dough ball while the grilling of the opposite side of the dough ball is completed, and then inverting the dough ball onto a grill and grilling the dry side thereof.

12. A continuous proofer for proofing unproofed English muffin dough balls comprising a first endless conveyor disposed above a second endless conveyor in a substantially horizontal relation, each of said conveyors having a belt-like web providing top and bottom runs and said webs moving at the same speed in opposite directions between respective forward and rearward end sprockets carried by respective parallel spaced shafts, each of said webs comprising a succession of narrow transversely extending sheet metal plates disposed in parallel edge-to-edge relation, each plate of the first conveyor having a flat outer surface throughout its length, said plates having identical center-to-center relation along the lengths of both said webs, the speed of said conveyors being adjustable to move one of the plates at the forward end of said second conveyor along the top run thereof to the rearward end of said proofer in a period of from 9 to 20 minutes, a plurality of individual open top product retaining cups of uniform height on the outer surface of each of the plates of said second conveyor, said first conveyor being disposed with the bottom run beginning at a predetermined distance rearward from the forward end of said second conveyor and extending parallel with the top run of said second conveyor, the outer surfaces of the conveyor plates in the bottom run of the first conveyor being spaced vertically from the top run of the second conveyor a distance substantially equal to the height of said retaining cups to cover the open tops thereof when said conveyors are running together, means disposed adjacent the rearward end of said second conveyor for heating the plates and retaining cups, said heating means being adjustable to heat said mold cups and elevate the mean temperature thereof at a uniform rate of between 7 and 14° F. per minute as said cups move rearwardly from the forward end of said second conveyor, and a moisture applicator disposed transversely over the forward end portion of said second conveyor and forwardly of said first conveyor, said applicator having nozzle means directed toward said cups passing thereunder and being adjustable to deposit moisture in an effective amount of 2 to 5 percent by weight of each dough ball into each cup whereby unproofed dough balls deposited in said cups at the forward end of said second conveyor are moistened with water and then progressively proofed as they are covered and carried along the top run of said second conveyor to the rearward end of said first conveyor.

References Cited in the file of this patent

UNITED STATES PATENTS

| | | |
|---|---|---|
| 1,130,568 | Callow | Mar. 2, 1915 |
| 1,169,023 | Embrey | Jan. 18, 1916 |
| 1,595,439 | Wilson et al. | Aug. 10, 1926 |
| 2,785,642 | Ward | Mar. 19, 1957 |
| 2,809,598 | Rayner | Oct. 15, 1957 |

FOREIGN PATENTS

| | | |
|---|---|---|
| 729,275 | Great Britain | May 4, 1955 |